L. & H. NILSON.
WHEEL.
APPLICATION FILED JAN. 8, 1918.

1,292,023.

Patented Jan. 21, 1919.

WITNESSES:

INVENTORS:
LEONARD NILSON.
HAROLD NILSON.
BY
ATTORNEYS.

UNITED STATES PATENT OFFICE.

LEONARD NILSON AND HAROLD NILSON, OF WAYZATA, MINNESOTA.

WHEEL.

1,292,023.   Specification of Letters Patent.   Patented Jan. 21, 1919.

Application filed January 8, 1918. Serial No. 210,923.

*To all whom it may concern:*

Be it known that we, LEONARD NILSON and HAROLD NILSON, citizens of the United States, residents of Wayzata, county of Hennepin, State of Minnesota, have invented certain new and useful Improvements in Wheels, of which the following is a specification.

The object of our invention is to provide a wheel designed particularly for traction machines of simple, economical construction and one which can be effectively used in soft ground for traction purposes, or on a highway in moving the machine from place to place.

Other objects of the invention will appear from the following detailed description.

The invention consists generally in various constructions and combinations, all as hereinafter described and particularly pointed out in the claims.

In the accompanying drawings forming part of this specification,

Figure 1:
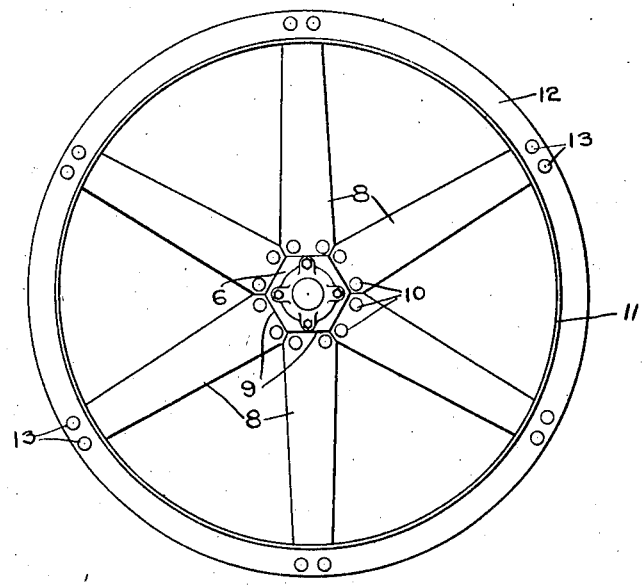
Figure 1 is a side elevation of the wheel embodying our invention.
Figure 2:
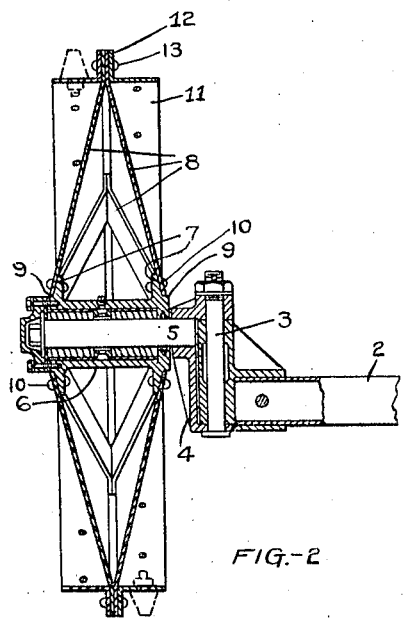
Fig. 2 is a vertical sectional view of the same.

In the drawing, 2 represents an axle, 3 a vertical stud or bolt on which the casting 4 of the wheel spindle is journaled. 6 is a hub mounted on the spindle 5 and having seats 7 thereon at each end for a series of spokes 8, made preferably of flat metal of suitable width and gage. These seats have shoulders 9 thereon against which the inner ends of the spokes are butted, a suitable means, such as rivets 10, securing the inner ends of the spokes to the hub. 11 represents the sections composing the rim of the wheel, each made preferably of angle bar bent into circular form with one flange forming the tread of the wheel and the other flange projecting outwardly from the center of the tread and forming a rib extending entirely around the wheel. These flanges may vary in width, according to the size of the wheels and the weight thereon. The outer ends of the spokes extend between the flanges 12 and are secured thereto by rivets 13 which pass through the flanges and through the abutting ends of the spokes, thereby riveting them and the flanges firmly together. The load on the wheel will exert a longitudinal thrust on the spokes, which will be transmitted to the shoulders 9 and prevent shearing of the rivets securing the spokes to the hubs and as the spokes flare or diverge near their outer ends, the load on the wheels 11 which might tend to shear the rivets at the outer ends of the spokes will be resisted by the engagement of the rim sections with the diverging portions of the spokes. When the machine is running on hard ground, the flanges of the rim sections at the center of the wheel will carry the load and form in effect a tire of substantially the ordinary width used in wheels for running on a highway or other hard ground. As shown in Fig. 2, the rim 11 has holes 11' therein into which traction cleats or studs may be mounted.

Figure 3:
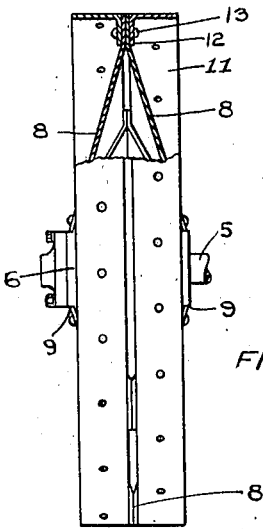
Fig. 3 is an edge view with the tread of the wheel partially broken away, showing a modified construction.

In Fig. 3 the same form of wheel is shown except that the flanges 12 are inwardly turned, the outer or tread surface being substantially the same distance from the center of the wheel at all points across the tread, the outer ends of the spokes being flush substantially with such surface.

This wheel may be made in various sizes and the width of the flanges of the rim sections may be varied to meet the different requirements of the wheel.

We claim as our invention:

1. A wheel comprising a hub, a rim therefor composed of angle bar sections bent to a circular form and having their vertical flanges placed back to back at the center of the wheel, the other flanges of said angle bar sections forming the tread of the wheel, said vertical flanges projecting outwardly beyond said tread and forming a narrow surface on which the wheel may roll on hard ground, and spoke members having their outer portions projecting between said vertical flanges and secured thereto and diverging within said rim sections and having their inner portions secured to the ends of said hub.

2. A wheel comprising a hub, a rim therefor composed of angle bar sections bent to a circular form and having their vertical flanges placed back to back at the center of the wheel, the horizontal flanges of said angle bar sections forming the tread of the wheel, said vertical flanges projecting outwardly beyond said tread and forming a narrow surface on which the wheel may roll on hard ground, and a series of spokes having their outer ends projecting between said vertical flanges and secured thereto and diverging within said rim sections and having their inner ends secured to the ends of said hub.

In witness whereof, we have hereunto set our hands this 7th day of December, 1917.

LEONARD NILSON.
HAROLD NILSON.